(12) United States Patent
Chen et al.

(10) Patent No.: US 11,923,886 B2
(45) Date of Patent: Mar. 5, 2024

(54) ANTENNA DEVICE AND METHOD FOR CONFIGURING THE SAME

(71) Applicants: Jhih-Ciang Chen, Taipei (TW); Shih-Chia Liu, Taipei (TW); Yen-Hao Yu, Taipei (TW); Li-Chun Lee, Taipei (TW); Yan-Ming Lin, Taipei (TW); Jui-Hung Lai, Taipei (TW)

(72) Inventors: Jhih-Ciang Chen, Taipei (TW); Shih-Chia Liu, Taipei (TW); Yen-Hao Yu, Taipei (TW); Li-Chun Lee, Taipei (TW); Yan-Ming Lin, Taipei (TW); Jui-Hung Lai, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 384 days.

(21) Appl. No.: 17/458,552

(22) Filed: Aug. 27, 2021

(65) Prior Publication Data

US 2022/0263531 A1 Aug. 18, 2022

Related U.S. Application Data

(60) Provisional application No. 63/121,208, filed on Dec. 3, 2020.

(51) Int. Cl.
*H01Q 1/48* (2006.01)
*H01Q 9/42* (2006.01)
*H04B 1/3827* (2015.01)

(52) U.S. Cl.
CPC ............. *H04B 1/3838* (2013.01); *H01Q 1/48* (2013.01); *H01Q 9/42* (2013.01)

(58) Field of Classification Search
CPC ........... H04B 1/3838; H01Q 1/48; H01Q 9/42
See application file for complete search history.

(56) References Cited

U.S. PATENT DOCUMENTS 6,592,245 B1 * 7/2003 Tribelsky ............... G02B 6/001
362/559
6,711,280 B2 * 3/2004 Stafsudd .............. G06V 10/255
348/622
7,446,716 B2 * 11/2008 Watanabe .............. H01Q 9/285
343/702

(Continued)

FOREIGN PATENT DOCUMENTS

TW 201814959 4/2018
TW 201911647 3/2019

OTHER PUBLICATIONS

"Office Action of Taiwan Counterpart Application", dated May 24, 2022, p. 1-p. 8.

*Primary Examiner* — Hai V Nguyen
(74) *Attorney, Agent, or Firm* — JCIPRNET

(57) ABSTRACT

An antenna device and a method for configuring the same are provided. The antenna device includes a grounding metal, a grounding part, a radiating part, a feeding part, a proximity sensor, and a sensing metal. The radiating part is electrically connected to the grounding metal through the grounding part. The feeding part is coupled to the grounding metal through a feeding point. The sensing metal is electrically connected to the proximity sensor. The sensing metal is separated from the radiating part at a distance. The distance is less than or equal to one thousandth of a wavelength corresponding to an operating frequency of the antenna device.

22 Claims, 6 Drawing Sheets

(56) References Cited

U.S. PATENT DOCUMENTS

| | | | |
|---|---|---|---|
| 8,314,769 B2 * | 11/2012 | Cole | G01J 5/0853 250/338.1 |
| 9,712,738 B2 * | 7/2017 | Van Heugten | H04N 23/959 |
| 10,381,722 B2 * | 8/2019 | Mei | H01Q 1/526 |
| 10,411,333 B1 * | 9/2019 | Chang | G06F 1/1698 |
| 10,643,040 B2 | 5/2020 | Ostermeier | G01D 11/00 |
| 10,658,753 B2 * | 5/2020 | Tseng | H01Q 9/42 |
| 11,081,785 B2 * | 8/2021 | Lyu | H01Q 1/48 |
| 11,101,574 B2 * | 8/2021 | Tsai | H01Q 1/38 |
| 11,121,449 B2 * | 9/2021 | Chang | H01Q 9/42 |
| 11,139,566 B2 * | 10/2021 | Chang | H01Q 1/52 |
| 11,211,708 B2 * | 12/2021 | Lo | H01Q 9/30 |
| 11,329,382 B1 * | 5/2022 | Lo | H01Q 1/243 |
| 11,469,512 B2 * | 10/2022 | Lai | H01Q 13/106 |
| 11,509,049 B2 * | 11/2022 | Oh | H01Q 1/243 |
| 11,569,585 B2 * | 1/2023 | Li | H01Q 21/06 |
| 11,652,292 B2 * | 5/2023 | Chang | H01Q 1/245 324/686 |
| 11,749,901 B2 * | 9/2023 | Chang | H01Q 9/42 343/908 |
| 11,749,903 B2 * | 9/2023 | Chan | H01Q 21/06 343/848 |
| 11,775,096 B2 * | 10/2023 | Choi | G06F 3/04164 345/156 |
| 11,782,564 B2 * | 10/2023 | Kim | G06F 3/04164 345/173 |
| 2002/0176605 A1 * | 11/2002 | Stafsudd | G06V 10/255 382/106 |
| 2004/0036653 A1 * | 2/2004 | Ishihara | H01Q 5/378 343/702 |
| 2006/0284772 A1 * | 12/2006 | Watanabe | H01Q 9/285 343/702 |
| 2008/0085021 A1 * | 4/2008 | Shim | A61N 1/16 381/189 |
| 2008/0198082 A1 * | 8/2008 | Soler Castany | H01Q 1/38 343/893 |
| 2011/0205524 A1 * | 8/2011 | Puzey | G01N 21/53 356/28 |
| 2011/0267322 A1 * | 11/2011 | Cole | G01J 5/0808 345/205 |
| 2013/0314285 A1 * | 11/2013 | Takasaki | H01Q 1/48 343/700 MS |
| 2013/0335258 A1 * | 12/2013 | Chung | H04B 1/3838 342/27 |
| 2014/0269972 A1 * | 9/2014 | Rada | H04B 15/00 375/285 |
| 2014/0315592 A1 * | 10/2014 | Schlub | H04W 52/367 455/522 |
| 2015/0141268 A1 * | 5/2015 | Rothberg | G01N 21/6486 438/22 |
| 2015/0149617 A1 * | 5/2015 | Lai | H04L 43/08 709/224 |
| 2017/0222678 A1 * | 8/2017 | Abreu | H04M 1/03 |
| 2017/0317413 A1 * | 11/2017 | Mei | H01Q 1/52 |
| 2018/0083353 A1 * | 3/2018 | Tseng | H01Q 1/245 |
| 2019/0044232 A1 * | 2/2019 | Tseng | H01Q 1/245 |
| 2019/0044561 A1 * | 2/2019 | Fernando | G01S 13/08 |
| 2019/0051033 A1 * | 2/2019 | Eilat | G06V 20/64 |
| 2019/0086741 A1 * | 3/2019 | Milton | G02F 1/134309 |
| 2019/0197269 A1 * | 6/2019 | Ostermeier | F26B 5/06 |
| 2019/0393918 A1 * | 12/2019 | Han | G06V 10/143 |
| 2020/0274570 A1 * | 8/2020 | Han | H04B 1/40 |
| 2021/0075085 A1 * | 3/2021 | Chang | H01Q 1/28 |
| 2021/0151871 A1 * | 5/2021 | Lyu | H01Q 1/521 |
| 2021/0167491 A1 * | 6/2021 | Chang | H01Q 1/48 |
| 2021/0167521 A1 * | 6/2021 | Tsai | H01Q 1/243 |
| 2021/0306022 A1 * | 9/2021 | Fernando | H01Q 3/267 |
| 2021/0344119 A1 * | 11/2021 | Chan | H01Q 1/48 |
| 2022/0021408 A1 * | 1/2022 | Yen | H04B 1/3838 |
| 2022/0027013 A1 * | 1/2022 | Kim | G06F 1/1698 |
| 2022/0034696 A1 * | 2/2022 | Conrads | G01F 1/7086 |
| 2022/0069466 A1 * | 3/2022 | Chang | H01Q 1/52 |
| 2022/0166454 A1 * | 5/2022 | Jaurigue | H04B 1/3838 |

* cited by examiner

ANTENNA DEVICE AND METHOD FOR CONFIGURING THE SAME

CROSS-REFERENCE TO RELATED APPLICATION

This application claims the priority benefit of U.S. provisional application Ser. No. 63/121,208, filed on Dec. 3, 2020. The entirety of the above-mentioned patent application is hereby incorporated by reference herein and made a part of this specification.

BACKGROUND

Technology Field

The disclosure relates to an antenna device and a method for configuring the antenna device.

Description of Related Art

To conform to the national electromagnetic wave specific absorption rate (SAR) standard, when designing an antenna, the designer often disposes a proximity sensor around the antenna. When a person approaches the antenna, the proximity sensor may notify a wireless communication module for controlling the antenna to reduce the transmit power of the antenna so that the antenna SAR value conforms to the standard. However, with the miniaturization of devices, the space available for disposing antennas has gradually shrunk. If the distance between the sensing metal of the proximity sensor and the antenna is too close, the sensing metal may cause destructive interference to the antenna, and therefore the effectiveness of the antenna is reduced.

SUMMARY

The disclosure provides an antenna device and a method for configuring the antenna device capable of reducing the destructive interference caused by a proximity sensor to a radiating part of the antenna device.

An antenna device of the disclosure includes a grounding metal, a grounding part, a radiating part, a feeding part, a proximity sensor, and a sensing metal. The radiating part is electrically connected to the grounding metal through the grounding part. The feeding part is coupled to the grounding metal through a feeding point. The sensing metal is electrically connected to the proximity sensor. The sensing metal is separated from the radiating part at a distance. The distance is less than or equal to one thousandth of a wavelength corresponding to an operating frequency of the antenna device.

In an embodiment of the disclosure, the radiating part and the sensing metal extend in a first direction. A first length of the sensing metal is less than or equal to a second length of the radiating part.

In an embodiment of the disclosure, the radiating part is parallel to the sensing metal.

In an embodiment of the disclosure, the antenna device further comprises a metal wire. The sensing metal is electrically connected to the proximity sensor through the metal wire.

In an embodiment of the disclosure, the metal wire is separated from the grounding part at a second distance. The second distance is equal to the distance.

In an embodiment of the disclosure, the radiating part is perpendicular to the grounding part.

In an embodiment of the disclosure, a width of the sensing metal is greater than or equal to one millimeter.

In an embodiment of the disclosure, the radiating part, the grounding part, and the feeding part are disposed on a surface of a substrate material.

In an embodiment of the disclosure, the radiating part and the sensing metal are disposed on a surface of a substrate material.

In an embodiment of the disclosure, the radiating part is in contact with a first surface of a substrate material. The sensing metal is in contact with a second surface of the substrate material. The first surface is opposite to the second surface.

In an embodiment of the disclosure, the feeding part is disposed between the radiating part and the grounding metal.

In an embodiment of the disclosure, the radiating part is disposed between the sensing metal and the grounding metal.

In an embodiment of the disclosure, the sensing metal is disposed in a slot formed by the radiating part, and the metal wire is disposed in a second slot formed by the grounding part.

In an embodiment of the disclosure, a projection of the sensing metal completely overlaps or partially overlaps the radiating part.

In an embodiment of the disclosure, a projection of the metal wire overlaps the grounding part.

In an embodiment of the disclosure, the metal wire is electrically connected to either an end or a middle end of the sensing metal.

In an embodiment of the disclosure, the grounding part is disposed between the metal wire and the feeding part.

In an embodiment of the disclosure, the sensing metal is disposed between the radiating part and the grounding metal.

In an embodiment of the disclosure, the radiating part, the grounding part, the feeding part, and the grounding metal form one of a coupling antenna and an inverted-F antenna.

In an embodiment of the disclosure, the proximity sensor transmits a command in response to the sensing metal sensing that an object approaches the sensing metal.

In an embodiment of the disclosure, the antenna device further includes a processor coupled to the proximity sensor and the feeding point. The processor reduces an intensity of a feeding signal fed to the feeding point in response to receiving the command.

In a method for configuring an antenna device of the disclosure, the antenna device includes a grounding metal, a grounding part, a radiating part, a feeding part, a proximity sensor, and a sensing metal. The method includes steps as follows. The radiating part is electrically connected to the grounding metal through the grounding part. The feeding part is coupled to the grounding metal through a feeding point, and the sensing metal is electrically connected to the proximity sensor. The sensing metal is separated from the radiating part at a distance. The distance is less than or equal to one thousandth of a wavelength corresponding to an operating frequency of the antenna device.

In summary, in the disclosure, the destructive interference caused by the sensing metal to the radiating part is reduced by optimizing the distance between the radiating part and the sensing metal of the proximity sensor. Therefore, the performance of the antenna device of the disclosure may not be reduced even though the antenna device is equipped with the proximity sensor.

DESCRIPTION OF THE EMBODIMENTS

Figure 1:
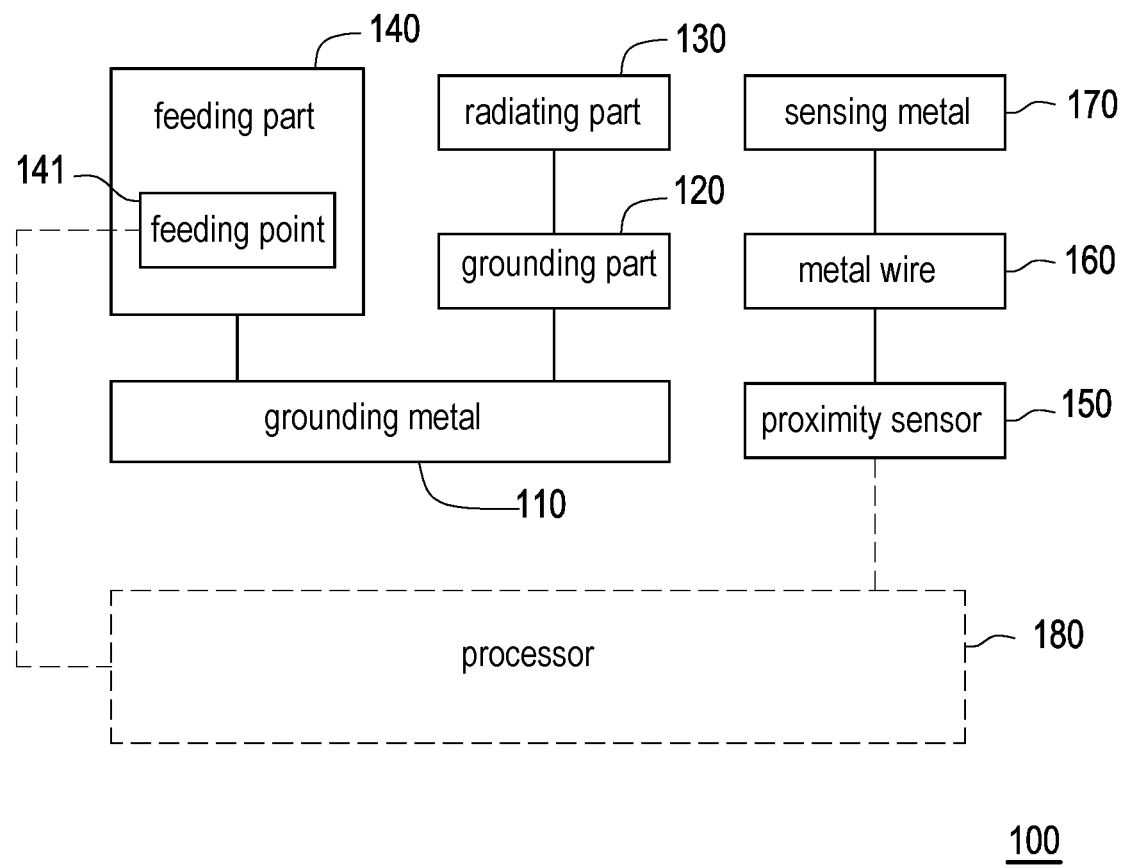
FIG. 1 is a schematic view of an antenna device according to an embodiment of the disclosure.

FIG. 1 is a schematic view of an antenna device 100 according to an embodiment of the disclosure. The antenna device 100 may include a grounding metal 110, a grounding part 120, a radiating part 130, a feeding part 140, a proximity sensor 150, a metal wire 160, and a sensing metal 170. In an embodiment, the antenna device 100 may further include a processor 180. The antenna device 100 may be disposed in an electronic device with a wireless communication function, and the electronic device may transmit or receive wireless signals through the antenna device 100.

The radiating part 130 is electrically connected to the grounding metal 110 through the grounding part 120. The radiating part 130 may be used to radiate or sense a wireless signal corresponding to the operating frequency. The feeding part 140 includes a feeding point 141. The feeding part 140 may be coupled to the grounding metal 110 through the feeding point 141. The feeding point 141 and the grounding metal 110 may not be in direct contact. The feeding part 140 may receive a feeding signal through the feeding point 141. The radiating part 130 may radiate a wireless signal corresponding to the feeding signal when the feeding part 140 receives the feeding signal.

The proximity sensor 150 may be electrically connected to the sensing metal 170 through the metal wire 160. When an object approaches the sensing metal 170, the sensing metal 170 may sense the object to generate an electrical signal and transmit the electrical signal to the proximity sensor 150 through the metal wire 160. The proximity sensor 150 may determine whether an object is approaching the antenna device 100 (or approaching the sensing metal 170) according to the received electrical signal. If the proximity sensor 150 determines that an object is approaching the antenna device 100, the proximity sensor 150 may send a command to the processor 180 to instruct to reduce the intensity or power of the feeding signal.

For example, the processor 180 is a central processing unit (CPU), other programmable general purpose or special purpose micro control units (MCUs), a microprocessor, a digital signal processor (DSP), other similar elements, or a combination thereof. The processor 180 may be coupled to the feeding point 141 and the proximity sensor 150. The processor 180 may reduce the intensity or power of the feeding signal in response to receiving a command from the proximity sensor 150. Therefore, when an object approaches the antenna device 100, the intensity of the feeding signal may be reduced, and the SAR value of the antenna device 100 conforms to the standard.

The radiating part 130, the grounding part 120, the feeding part 140, and the grounding metal 110 may form different types of antennas, and the disclosure is not limited thereto. In an embodiment, the radiating part 130, the grounding part 120, the feeding part 140, and the grounding metal 110 may form a coupling antenna. In an embodiment, the radiating part 130, the grounding part 120, the feeding part 140, and the grounding metal 110 may form an inverted-F antenna or a planar inverted-F antenna.

The sensing metal 170 may be separated from the radiating part 130 at a distance, and the distance may be less than or equal to one thousandth of the wavelength corresponding to the operating frequency of the antenna device 100. The radiating part 130 and the sensing metal 170 may both extend in a first direction. The radiating part 130 may be parallel to the sensing metal 170. The first length of the sensing metal 170 may be less than or equal to the second length of the radiating part 130. The width of the sensing metal 170 may be greater than or equal to one millimeter.

On the other hand, the metal wire 160 may be separated from the grounding part 120 at a distance, and the distance has an adjustment and matching function. The distance may be less than or equal to one thousandth of the wavelength corresponding to the operating frequency of the antenna device 100. That is, the distance between the sensing metal 170 and the radiating part 130 may be equal to the distance between the metal wire 160 and the grounding part 120. Meanwhile, the destructive interference of the sensing metal 170 to the radiating part 130 may be minimized. The metal wire 160 and the grounding part 120 may both extend in the second direction. In an embodiment, the first direction may be perpendicular to the second direction. That is, the radiating part 130 (or the sensing metal 170) may be perpendicular to the grounding part 120 (or the metal wire 160).

In an embodiment, the radiating part 130, the grounding part 120, and the feeding part 140 may be disposed on the surface of the substrate material. In an embodiment, the radiating part 130 and the sensing metal 170 may be disposed on the surface of the substrate material. In an embodiment, the radiating part 130 may be in contact with the first surface of the substrate material, the sensing metal 170 may be in contact with the second surface of the substrate material, and the first surface is opposite to the second surface. That is, the radiating part 130 and the sensing metal 170 respectively may be disposed on two opposite surfaces of the substrate material. In an embodiment, the thickness of the substrate material may be less than or equal to one thousandth of the wavelength corresponding to the operating frequency, and the distance between the radiating part 130 and the sensing metal 170 is ensured to be less than or equal to one thousandth of the wavelength corresponding to the operating frequency.

Figure 2:
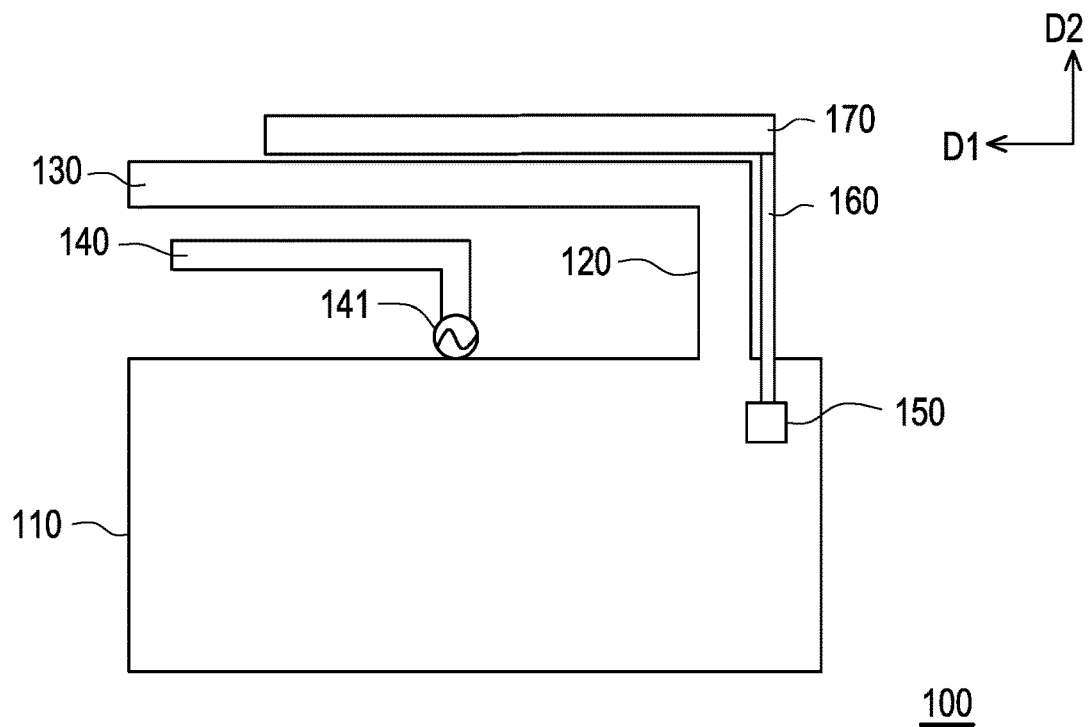
FIG. 2 is a top view of an antenna device according to an embodiment of the disclosure.

FIG. 2 is a top view of the antenna device 100 according to an embodiment of the disclosure. In the embodiment, the feeding part 140 may be disposed between the radiating part 130 and the grounding metal 110. The radiating part 130 may be disposed between the sensing metal 170 and the grounding metal 110 (or the feeding part 140). The metal wire 160 may be electrically connected to the end of the sensing metal 170. The grounding part 120 may be disposed between the metal wire 160 and the feeding part 140. The grounding part 120 may be disposed between the sensing metal 170 and the grounding metal 110. The radiating part 130 and the sensing metal 170 may extend in a first direction D1, and the length of the sensing metal 170 may be less than or equal to the length of the radiating part 130. The grounding part 120 and the metal wire 160 may be parallel to a second direction D2, and the second direction D2 may be perpendicular to the first direction D1.

Figure 3:
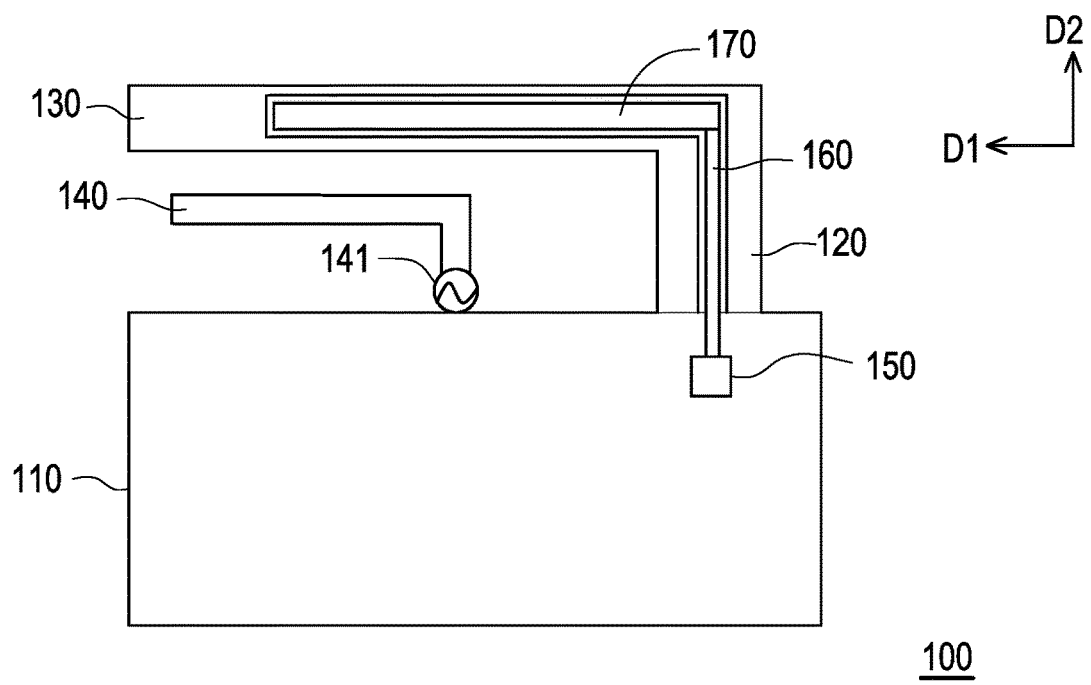
FIG. 3 is a top view of another antenna device according to an embodiment of the disclosure.

FIG. 3 is a top view of another antenna device 100 according to an embodiment of the disclosure. In the embodiment, the feeding part 140 may be disposed between the radiating part 130 and the grounding metal 110. The sensing metal 170 may be disposed in a slot formed by the radiating part 130. The metal wire 160 may be disposed in a slot formed by the grounding part 120. The metal wire 160 may be electrically connected to the end of the sensing metal 170. The radiating part 130 and the sensing metal 170 may extend in the first direction D1, and the length of the sensing metal 170 may be less than or equal to the length of the radiating part 130. The grounding part 120 and the metal wire 160 may be parallel to the second direction D2, and the second direction D2 may be perpendicular to the first direction D1.

Figure 4:
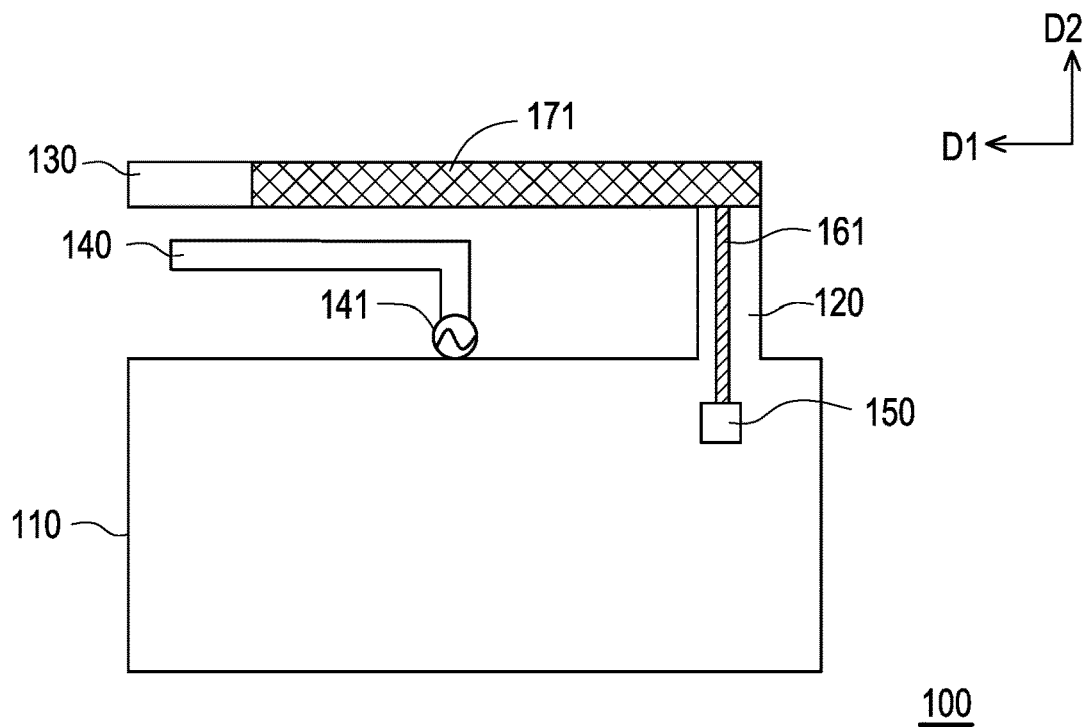
FIG. 4 is a top view of another antenna device according to an embodiment of the disclosure.

FIG. 4 is a top view of another antenna device 100 according to an embodiment of the disclosure. In the embodiment, the feeding part 140 may be disposed between the radiating part 130 (or the sensing metal 170) and the grounding metal 110. A projection 171 of the sensing metal 170 may completely overlap the radiating part 130. For example, if the radiating part 130 is disposed on the surface of the substrate material, the projection 171 of the sensing metal 170 on the surface may completely overlap the radiating part 130. The metal wire 160 may be electrically connected to the middle end of the sensing metal 170, and the middle end is used to connect the two ends of the sensing metal 170. That is, the middle end of the sensing metal 170 may be located between an end of the sensing metal 170 and the other end opposite to the end. A projection 161 of the metal wire 160 may overlap with the grounding part 120. For example, if the grounding part 120 is disposed on the surface of the substrate material, the projection 161 of the metal wire 160 on the surface may overlap the grounding part 120. The radiating part 130 and the sensing metal 170 may extend in the first direction D1, and the length of the sensing metal 170 may be less than or equal to the length of the radiating part 130. The grounding part 120 and the metal wire 160 may be parallel to the second direction D2, and the second direction D2 may be perpendicular to the first direction D1.

Figure 5:
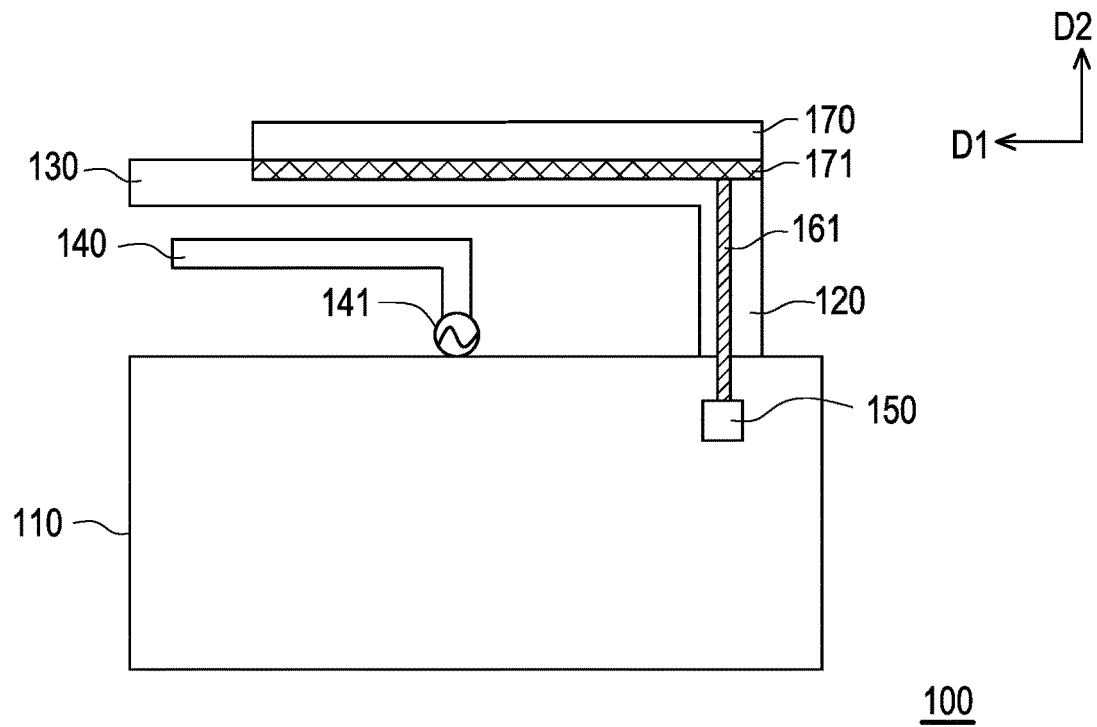
FIG. 5 is a top view of another antenna device according to an embodiment of the disclosure.

FIG. 5 is a top view of another antenna device 100 according to an embodiment of the disclosure. In the embodiment, the feeding part 140 may be disposed between the radiating part 130 (or the sensing metal 170) and the grounding metal 110. The projection 171 of the sensing metal 170 may partially overlap the radiating part 130. For example, if the radiating part 130 is disposed on the surface of the substrate material, the projection 171 of the sensing metal 170 on the surface may completely overlap the radiating part 130. The metal wire 160 may be electrically connected to the middle end of the sensing metal 170. The projection 161 of the metal wire 160 may overlap the grounding part 120. For example, if the grounding part 120 is disposed on the surface of the substrate material, the projection 161 of the metal wire 160 on the surface may overlap the grounding part 120. The radiating part 130 and the sensing metal 170 may extend in the first direction D1, and the length of the sensing metal 170 may be less than or equal to the length of the radiating part 130. The grounding part 120 and the metal wire 160 may be parallel to the second direction D2, and the second direction D2 may be perpendicular to the first direction D1.

Figure 6:
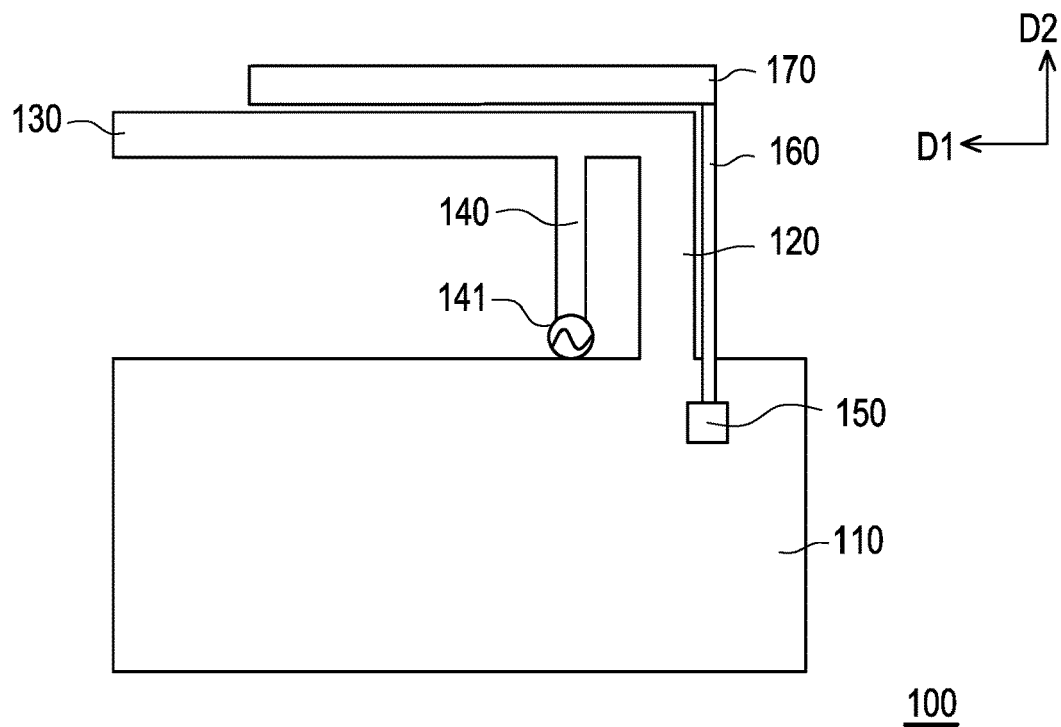
FIG. 6 is a top view of another antenna device according to an embodiment of the disclosure.

FIG. 6 is a top view of another antenna device 100 according to an embodiment of the disclosure. In the embodiment, the feeding part 140 may be disposed between the radiating part 130 (or the sensing metal 170) and the grounding metal 110. The radiating part 130 may be disposed between the sensing metal 170 and the grounding metal 110. The grounding part 120 may be disposed between the radiating part 130 (or the sensing metal 170) and the grounding metal 110. The metal wire 160 may be electrically connected to the end of the sensing metal 170. The grounding part 120 may be disposed between the metal wire 160 and the feeding part 140. The radiating part 130 and the sensing metal 170 may extend in the first direction D1, and the length of the sensing metal 170 may be less than or equal to the length of the radiating part 130. The grounding part 120 and the metal wire 160 may be parallel to the second direction D2, and the second direction D2 may be perpendicular to the first direction D1.

Figure 7:
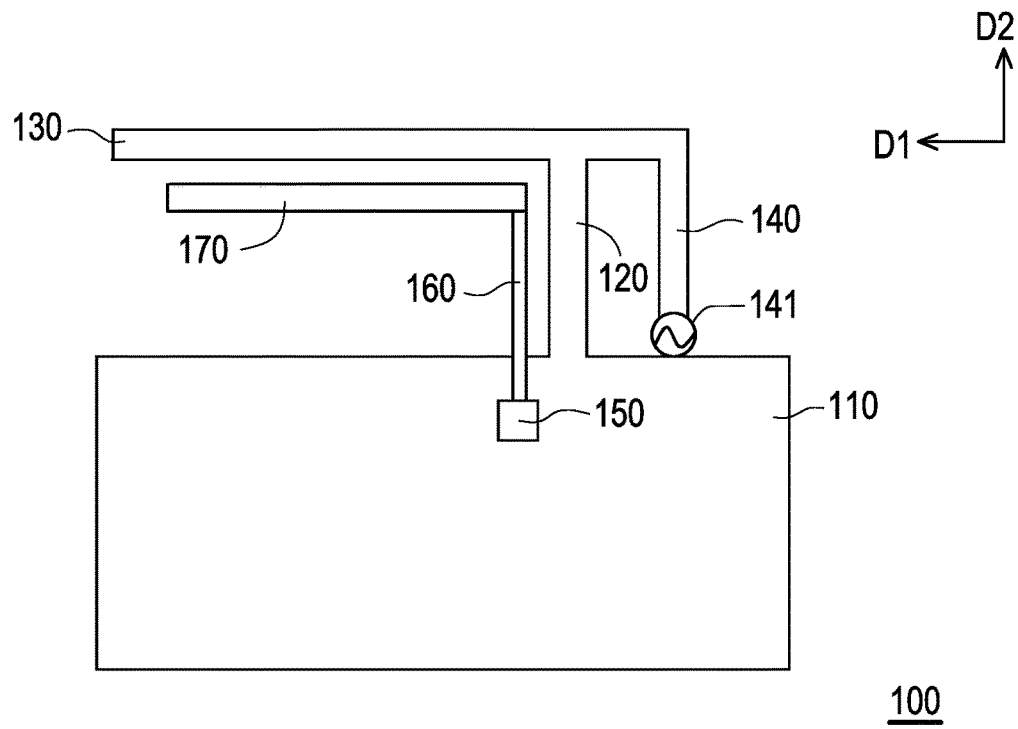
FIG. 7 is a top view of another antenna device according to an embodiment of the disclosure.

FIG. 7 is a top view of another antenna device 100 according to an embodiment of the disclosure. In the embodiment, the feeding part 140 may be disposed between the radiating part 130 and the grounding metal 110. The grounding part 120 may be disposed between the radiating part 130 and the grounding metal 110. The grounding part 120 may be disposed between the feeding part 140 and the metal wire 160. The metal wire 160 may be electrically connected to the end of the sensing metal 170. The sensing metal 170 may be disposed between the radiating part 130 and the grounding metal 110. The radiating part 130 and the sensing metal 170 may extend in the first direction D1, and the length of the sensing metal 170 may be less than or equal to the length of the radiating part 130. The grounding part 120 and the metal wire 160 may be parallel to the second direction D2, and the second direction D2 may be perpendicular to the first direction D1.

Figure 8:
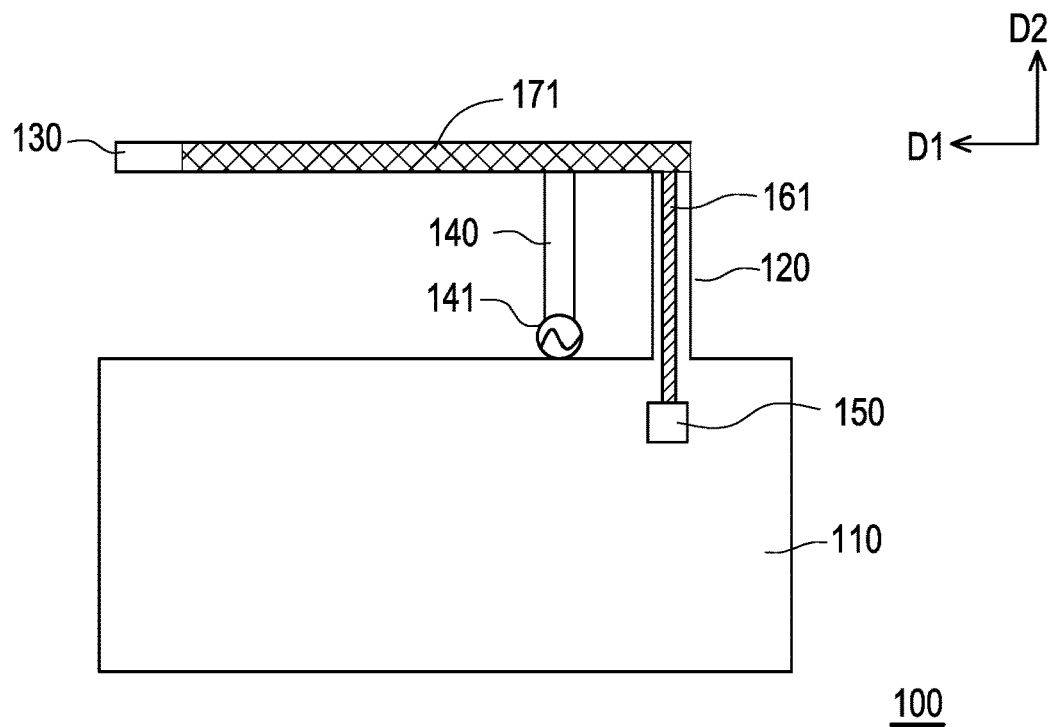
FIG. 8 is a top view of another antenna device according to an embodiment of the disclosure.

FIG. 8 is a top view of another antenna device 100 according to an embodiment of the disclosure. In the embodiment, the feeding part 140 may be disposed between the radiating part 130 (or the sensing metal 170) and the grounding metal 110. The grounding part 120 may be disposed between the radiating part 130 (or the sensing metal 170) and the grounding metal 110. The projection 171 of the sensing metal 170 may completely overlap the radiating part 130. For example, if the radiating part 130 is disposed on the surface of the substrate material, the projection 171 of the sensing metal 170 on the surface may completely overlap the radiating part 130. The metal wire 160 may be electrically connected to the middle end of the sensing metal 170. The projection 161 of the metal wire 160 may overlap the grounding part 120. For example, if the grounding part 120 is disposed on the surface of the substrate material, the projection 161 of the metal wire 160 on the surface may overlap the grounding part 120. The radiating part 130 and the sensing metal 170 may extend in the first direction D1, and the length of the sensing metal 170 may be less than or equal to the length of the radiating part 130. The grounding part 120 and the metal wire 160 may be parallel to the second direction D2, and the second direction D2 may be perpendicular to the first direction D1.

Figure 9:
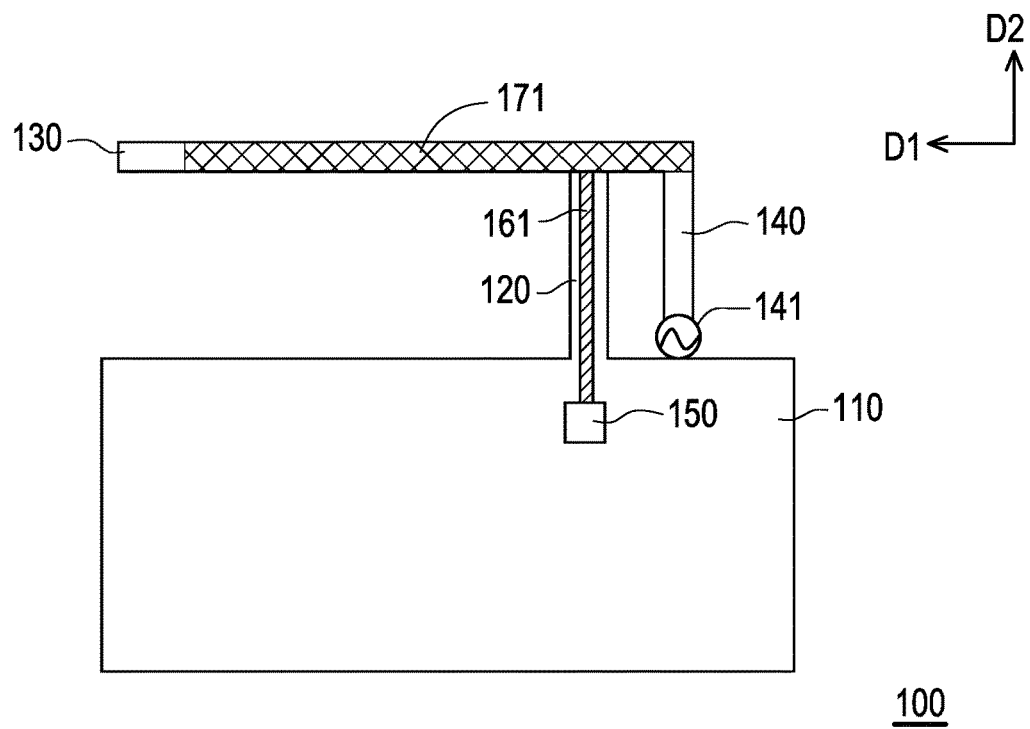
FIG. 9 is a top view of another antenna device according to an embodiment of the disclosure.

FIG. 9 is a top view of another antenna device 100 according to an embodiment of the disclosure. In the embodiment, the feeding part 140 may be disposed between the radiating part 130 (or the sensing metal 170) and the grounding metal 110. The grounding part 120 may be disposed between the radiating part 130 (or the sensing metal 170) and the grounding metal 110. The projection 171 of the sensing metal 170 may completely overlap the radiating part 130. For example, if the radiating part 130 is disposed on the surface of the substrate material, the projection 171 of the sensing metal 170 on the surface may completely overlap the radiating part 130. The metal wire 160 may be electrically connected to the middle end of the sensing metal 170. The projection 161 of the metal wire 160 may overlap the grounding part 120. For example, if the grounding part 120 is disposed on the surface of the substrate material, the projection 161 of the metal wire 160 on the surface may overlap the grounding part 120. The radiating part 130 and the sensing metal 170 may extend in the first direction D1, and the length of the sensing metal 170 may be less than or equal to the length of the radiating part 130. The grounding part 120 and the metal wire 160 may be parallel to the second direction D2, and the second direction D2 may be perpendicular to the first direction D1.

Figure 10:
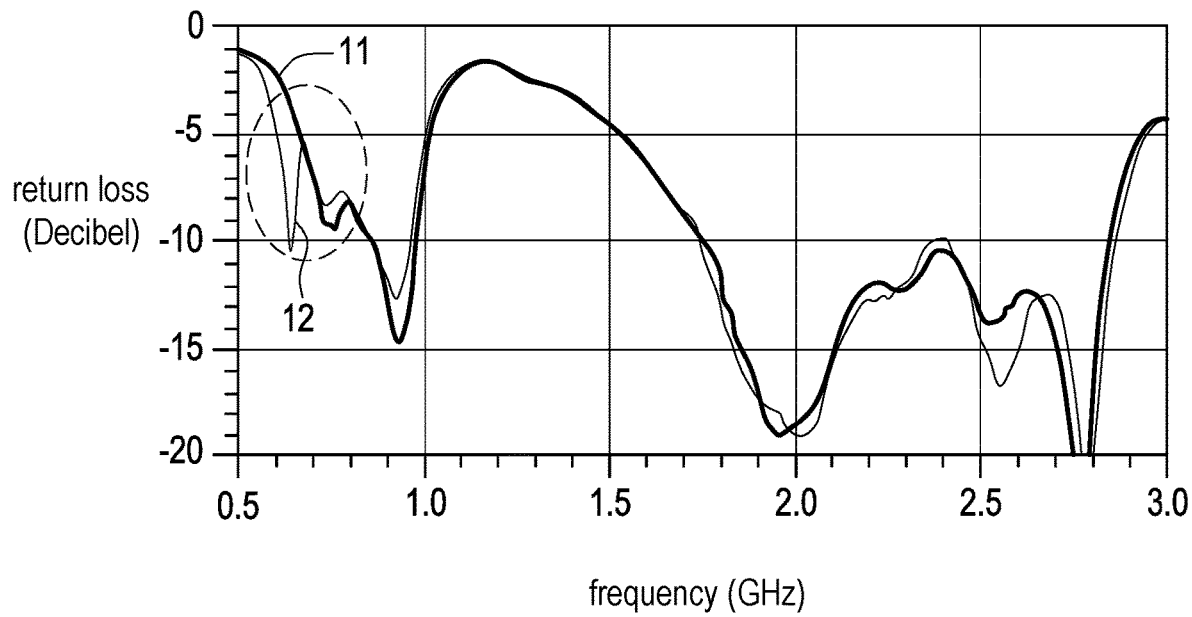
FIG. 10 is a schematic view of the return loss of an antenna device according to an embodiment of the disclosure.

FIG. 10 is a schematic view of the return loss of the antenna device 100 according to an embodiment of the disclosure. If the antenna device 100 operates in a frequency between 0.7 GHz and 3 GHz, curve 11 represents the return loss of the antenna device 100 when the distance between the radiating part 130 and the sensing metal 170 is equal to 0.1 mm, and curve 12 represents the return loss of the antenna device 100 when the distance between the radiating part 130 and the sensing metal 170 is equal to 1 mm. 0.1 mm meets the condition of "less than or equal to one thousandth of the wavelength corresponding to the operating frequency of the antenna device 100", and 1 mm does not meet the condition of "less than or equal to one thousandth of the wavelength corresponding to the operating frequency of the antenna device 100". According to FIG. 10, in the frequency between 0.5 GHz and 1 GHz, the waveform of curve 12 has undergone a drastic change, and this change is the destructive interference caused by the sensing metal 170 to the radiating part 130. In contrast, the waveform of curve 11 is relatively gentle. That is, the sensing metal 170 does not cause destructive interference to the radiating part 130.

Figure 11:
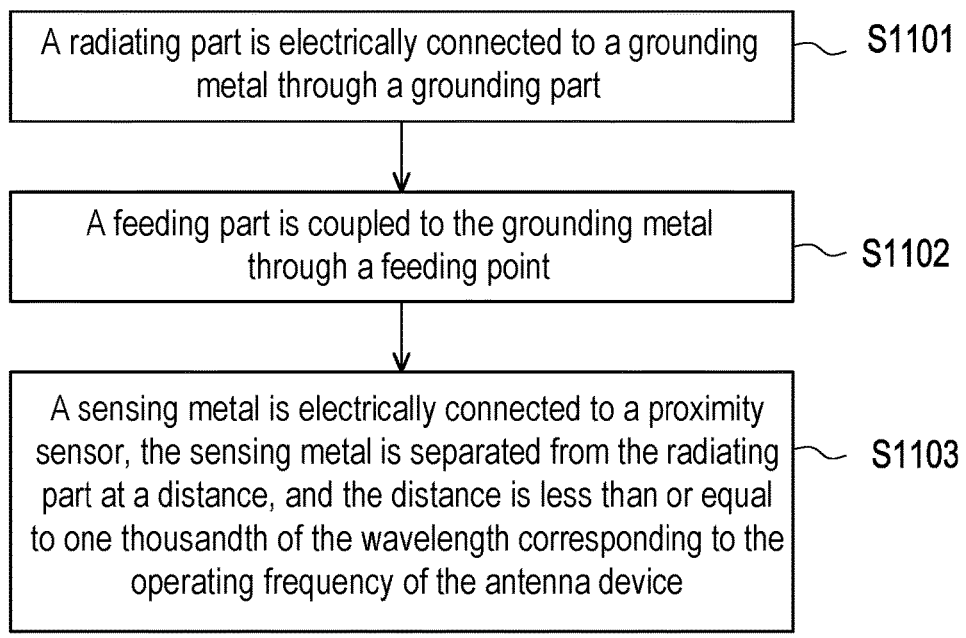
FIG. 11 is a flowchart illustrating a method for configuring an antenna device according to an embodiment of the disclosure.

FIG. 11 is a flowchart illustrating a method for configuring an antenna device according to an embodiment of the disclosure. The method may be implemented by the antenna device 100 shown in FIG. 1. In step S1101, the radiating part is electrically connected to the grounding metal through the grounding part. In step S1102, the feeding part is coupled to the grounding metal through the feeding point. In step S1103, the sensing metal is electrically connected to the proximity sensor, the sensing metal is separated from the radiating part at a distance, and the distance is less than or equal to one thousandth of the wavelength corresponding to the operating frequency of the antenna device.

In summary, the antenna device of the disclosure may optimize the distance between the radiating part and the sensing metal of the proximity sensor according to the operating frequency of the antenna device, so the distance is maintained at one thousandth of the wavelength of the operating frequency, and the length of the sensing metal is less than or equal to the length of the radiating part. Accordingly, the destructive interference caused by the sensing metal to the radiating part may be reduced. Therefore, although the antenna device of the disclosure is equipped with a proximity sensor, the performance of the antenna device may not be reduced by destructive interference.

What is claimed is:

1. An antenna device, comprising:
   a grounding metal;
   a grounding part;
   a radiating part electrically connected to the grounding metal through the grounding part;
   a feeding part coupled to the grounding metal through a feeding point;
   a proximity sensor; and
   a sensing metal electrically connected to the proximity sensor, wherein the sensing metal is separated from the radiating part at a distance, wherein the distance is less than or equal to one thousandth of a wavelength corresponding to an operating frequency of the antenna device.

2. The antenna device according to claim 1, wherein the radiating part and the sensing metal extend in a first direction, wherein a first length of the sensing metal is less than or equal to a second length of the radiating part.

3. The antenna device according to claim 1, wherein the radiating part is parallel to the sensing metal.

4. The antenna device according to claim 1, further comprising:
   a metal wire, wherein the sensing metal is electrically connected to the proximity sensor through the metal wire.

5. The antenna device according to claim 4, wherein the metal wire is separated from the grounding part at a second distance, wherein the second distance is equal to the distance.

6. The antenna device according to claim 1, wherein the radiating part is perpendicular to the grounding part.

7. The antenna device according to claim 1, wherein a width of the sensing metal is greater than or equal to one millimeter.

8. The antenna device according to claim 1, wherein the radiating part, the grounding part, and the feeding part are disposed on a surface of a substrate material.

9. The antenna device according to claim 1, wherein the radiating part and the sensing metal are disposed on a surface of a substrate material.

10. The antenna device according to claim 1, wherein the radiating part is in contact with a first surface of a substrate material, wherein the sensing metal is in contact with a second surface of the substrate material, wherein the first surface is opposite to the second surface.

11. The antenna device according to claim 1, wherein the feeding part is disposed between the radiating part and the grounding metal.

12. The antenna device according to claim 1, wherein the radiating part is disposed between the sensing metal and the grounding metal.

13. The antenna device according to claim 4, wherein the sensing metal is disposed in a slot formed by the radiating part, and the metal wire is disposed in a second slot formed by the grounding part.

14. The antenna device according to claim 1, wherein a projection of the sensing metal completely overlaps or partially overlaps the radiating part.

15. The antenna device according to claim 4, wherein a projection of the metal wire overlaps the grounding part.

16. The antenna device according to claim 4, wherein the metal wire is electrically connected to either an end or a middle end of the sensing metal.

17. The antenna device according to claim 4, wherein the grounding part is disposed between the metal wire and the feeding part.

18. The antenna device according to claim 1, wherein the sensing metal is disposed between the radiating part and the grounding metal.

19. The antenna device according to claim 1, wherein the radiating part, the grounding part, the feeding part, and the grounding metal form one of a coupling antenna and an inverted-F antenna.

20. The antenna device according to claim 1, wherein the proximity sensor transmits a command in response to the sensing metal sensing that an object approaches the sensing metal.

21. The antenna device according to claim 20, further comprising:
 a processor coupled to the proximity sensor and the feeding point, wherein the processor reduces an intensity of a feeding signal fed to the feeding point in response to receiving the command.

22. A method for configuring an antenna device, wherein the antenna device comprises a grounding metal, a grounding part, a radiating part, a feeding part, a proximity sensor, and a sensing metal, wherein the method comprises:
 electrically connecting the radiating part to the grounding metal through the grounding part;
 coupling the feeding part to the grounding metal through a feeding point; and
 electrically connecting the sensing metal to the proximity sensor, wherein the sensing metal is separated from the radiating part at a distance, wherein the distance is less than or equal to one thousandth of a wavelength corresponding to an operating frequency of the antenna device.

\* \* \* \* \*